Nov. 2, 1965  W. R. SHAVER  3,215,283
LONG TRAVEL HYDRAULIC CUSHION DEVICE
Filed March 18, 1964  3 Sheets-Sheet 1
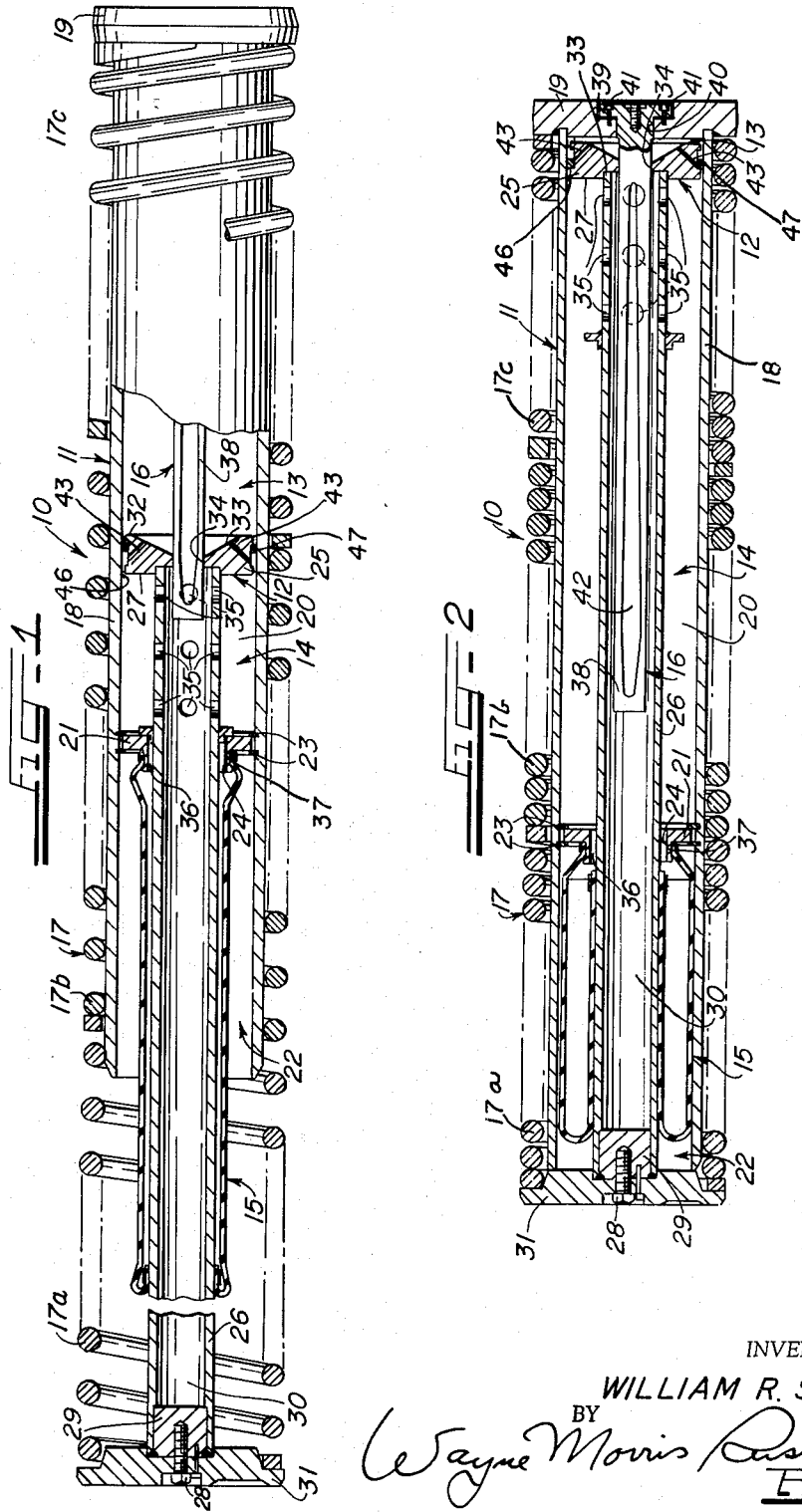
INVENTOR.
WILLIAM R. SHAVER Nov. 2, 1965  W. R. SHAVER  3,215,283
LONG TRAVEL HYDRAULIC CUSHION DEVICE
Filed March 18, 1964  3 Sheets-Sheet 2
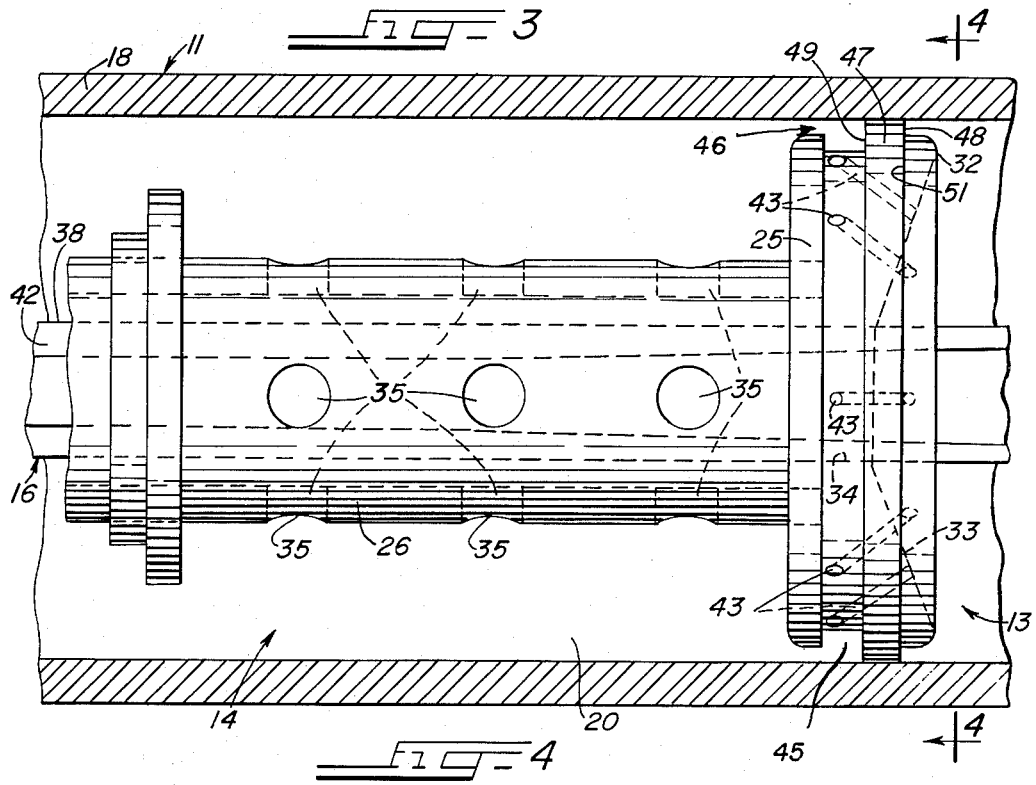
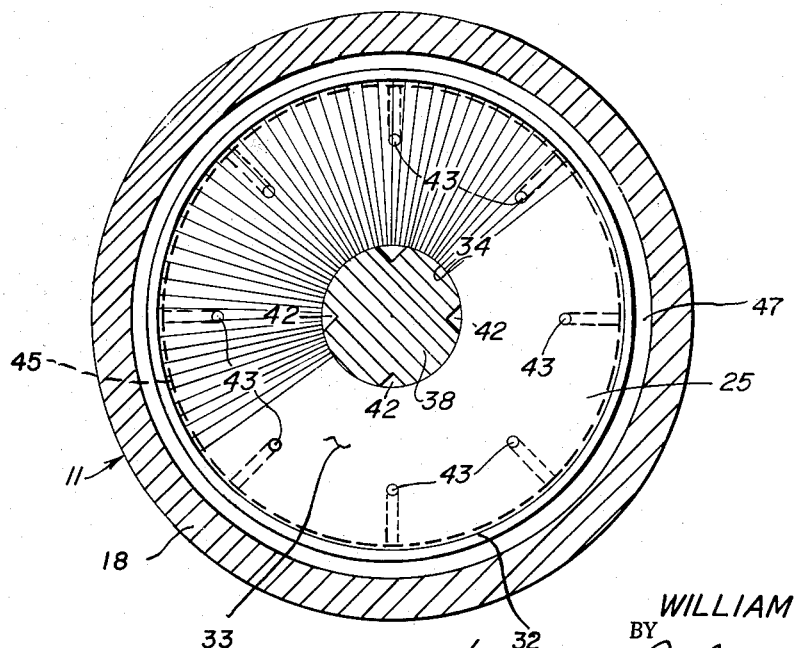
INVENTOR.
WILLIAM R. SHAVER Nov. 2, 1965  W. R. SHAVER  3,215,283
LONG TRAVEL HYDRAULIC CUSHION DEVICE
Filed March 18, 1964  3 Sheets-Sheet 3

INVENTOR.
WILLIAM R. SHAVER
BY Wayne Morris Russell
ATTY.

United States Patent Office 3,215,283
Patented Nov. 2, 1965

3,215,283
LONG TRAVEL HYDRAULIC CUSHION DEVICE
William R. Shaver, Munster, Ind., assignor to Pullman Incorporated, Chicago, Ill., a corporation of Delaware
Filed Mar. 18, 1964, Ser. No. 352,752
7 Claims. (Cl. 213—43)

The present invention relates to hydraulic cushion devices of the type employed in cushion underframe railway vehicles wherein the coupler carrying structure and the lading supporting structures are relatively slidable lengthwise of each other and the hydraulic cushion device is interposed for interaction between the aforementioned structures to absorb a portion of the impact energy and thereby prevent lading damage.

More specifically, the invention concerns a hydraulic device incorporating a new and improved hydraulic fluid displacement means for assuring that the cushion device is effective to absorb a portion of the kinetic energy of impact imparted thereto.

The hydraulic cushion device, to which the present invention relates, comprises generally a hydraulic fluid filled cylinder and a fluid displacement means. The cylinder and fluid displacement means are arranged to reciprocate relative to each other between a neutral extended position and to a contracted position upon impact to either the cylinder or fluid displacement means. Relative movement of the cylinder and fluid displacement means is operative to displace the hydraulic fluid from a high pressure chamber to a low pressure chamber which results in absorbing a portion of the kinetic energy of the impact force.

Communication between the high pressure chamber and the low pressure chamber is established by way of an orifice having a metering pin associated therewith. The metering pin serves to vary the effective orifice area during contraction of the cushion device so as to impart a substantially constant force travel characteristic to the cushion unit.

The hydraulic cushion device is characterized by a construction which utilizes solely static seals. To this end there is employed a flexible boot reservoir which closes off the open end of the cylinder. In the neutral or extended position of the fluid displacement means the flexible reservoir is substantially devoid of hydraulic fluid. Upon impact to the device a volume of the displaced fluid is received within the flexible reservoir so that the latter expands.

Also associated with the cushion device between the cylinder and the fluid displacement means is a return spring which serves to return the cushion device components to the neutral position. During the return movement of the cushion device, the hydraulic fluid flow is reversed such that the flexible boot reservoir is again deflated and the hydraulic fluid flows from the low pressure chamber to fill the volume of the high pressure chamber preparatory to receiving another impact.

The rate of the return flow is determined by the effective orifice area available between the low and high pressure chambers and to some extent by the force exerted on the hydraulic fluid by the expanded flexible boot. In view of the substantially constant force travel characteristic of the cushion device, the effective orifice area during the initial return travel from the contracted position is at a minimum. Thus, under some circumstances the return flow of the hydraulic fluid to the low pressure chamber is restricted particularly if the force exerted by the expanded boot is inadequate to increase the rate of flow through the minimum orifice area.

The above described restricted flow may be such that the volume of the low pressure in the extended or neutral position of the device is not immediately completely filled with all of the hydraulic fluid initially displaced therefrom. This also results in a portion of the displaced fluid remaining within the flexible boot reservoir such that the latter remains partially expanded.

In the event impacts are rapidly and sequentially applied on the cushion device before the hydraulic fluid is completely returned to the original position, it is readily apparent that in the absence of the full volume of hydraulic fluid in the high pressure chamber creates a vacuum therein such that the resisting or cushioning force is materially reduced. At the same time the additional hydraulic fluid displaced upon further impact will cause the still partially expanded flexible boot reservoir to be filled beyond its design capacity.

It is accordingly a principal object of the present invention to provide a cushion device of the above generally described type with means for assuring that the reverse flow of hydraulic fluid is adequate to return the fluid in a capacity sufficient to fill the original volume and thereby to achieve the requisite cushion force.

It is a further object of the invention to provide a cushion device with a fluid displacement means including a piston head formed with means providing reverse flow passages, which permits the flow of hydraulic fluid therethrough from the low pressure chamber and the high pressure chamber during the return of cushion device from the contracted to the neutral position only and thereby to assure adequate reverse flow to completely fill the high pressure chamber.

Further objects and features will hereinafter appear.

In the drawings:

FIG. 1 is a fragmentary view partially in section of the cushion device embodying the present invention and with the components shown in the extended neutral position;

FIG. 2 is a cross section view of the cushion device of FIG. 1, but showing the components in the contracted position;

FIG. 3 is a fragmentary enlarged sectional view through the cylinder showing the relationship of the metering pin and the components of the fluid displacement means during the return travel from the contracted to the neutral position of the cushion device;

FIG. 4 is a sectional view taken generally along the lines 4—4 of FIG. 3;

Figure 5:
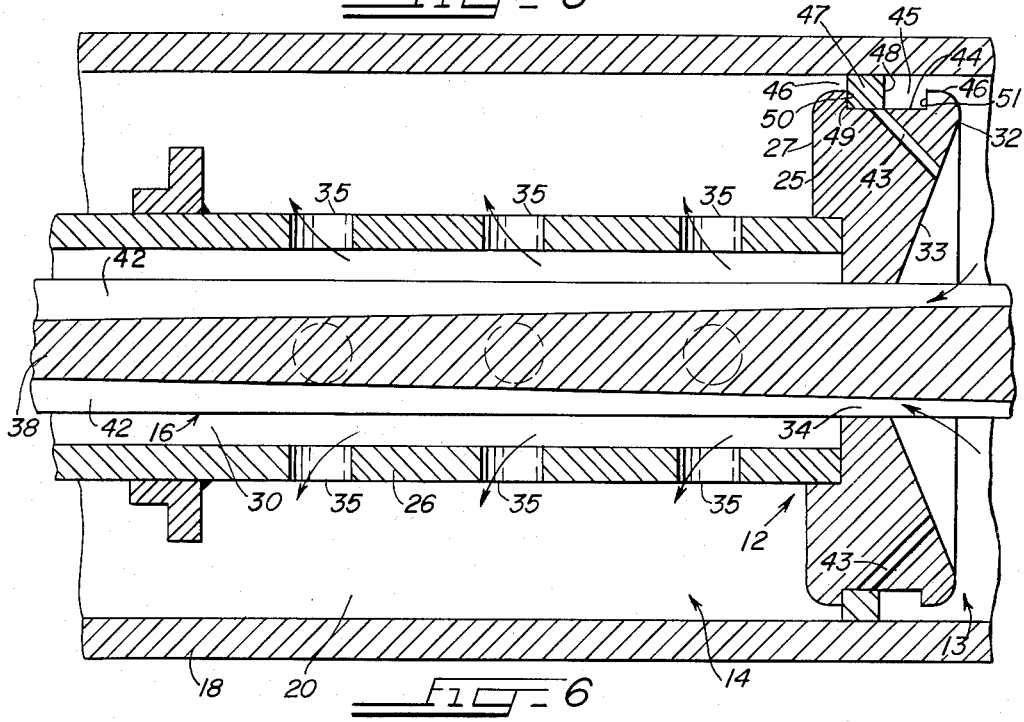
Figure 6:
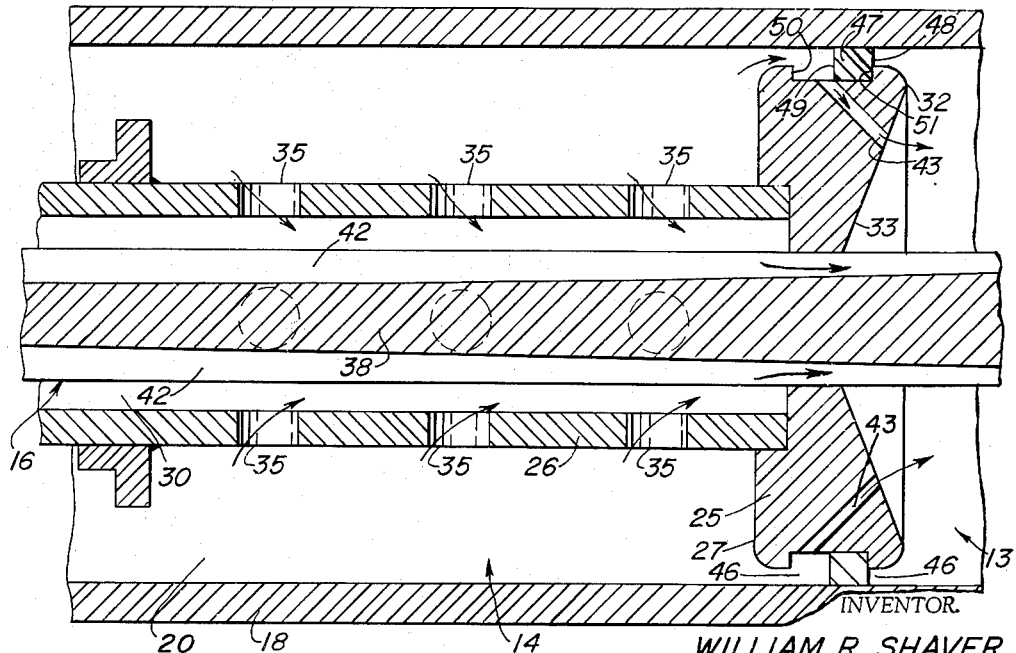

FIG. 5 is a fragmentary enlarged sectional view similar to FIG. 3, but showing the components of the fluid displacement means during the travel of the cushion device from the neutral to contracted position; and FIG. 6 is a fragmentary enlarged sectional view similar to FIG. 3 but showing the components of the fluid displacement means during the travel from the contracted to neutral positions of the cushion device.

Referring now to the figures there is shown a hydraulic cushion device 10 comprising essentially a hydraulic fluid filled cylinder 11; a fluid displacement means 12 which is reciprocable relative to the cylinder 11 between the neutral extended position shown in FIG. 1 to a contracted position shown in FIG. 2 for displacing fluid from a high pressure chamber 13 to a low pressure chamber 14; a flexible boot reservoir 15 connected between the cylinder 11 and the fluid displacement means 12 for receiving a portion of the hydraulic fluid displaced during contraction; a metering pin 16 for metering the flow between the high pressure chamber 13 and the low pressure chamber 14; and a return spring means 17 for returning the fluid displacement means 12 and the cylinder 11 to the neutral position after the shock of impact causing the contraction has been dissipated.

As shown in FIGS. 1 and 2, the cylinder 11 is formed from a cylindrical tube 18 which may be made from a suitable steel or the like. Fixed as by welding to one end of the tube 18 is a follower or base plate 19 which extends beyond the outer circumference of the tube 18 to provide a return spring retaining ledge.

Fixed within the cylinder bore 20 inwardly of the open end thereof is an intermediate cylinder head 21 defining, adjacent the open end, a boot chamber 22 for accommodating the flexible boot 15. Fixing the intermediate cylinder head 21 within the cylinder bore 20 are snap rings 23. Axially extending through the intermediate cylinder head 21 is an axial opening 24.

The fluid displacement means 12 includes a piston head 25 and a tubular piston rod 26 of which one end is fixed to the low pressure face 27 of the piston head 25. The other end of the tubular piston rod 26 extends through the axial opening 24 and outwardly of the open end of the cylinder 11. Fixed to the outwardly extending end of the tubular piston rod 26 as by a fastening stud 28 threaded into a fastening block 29 fixed within the piston rod bore, is a second base plate 31.

As shown, the high pressure face 32 of the piston head 25, which may be formed from a suitable metal such as cast iron, is formed with a conical feed surface 33 which merges with an axial orifice 34. The axial orifice 34 is coaxial with the piston rod bore 30 and the latter communicates with the low pressure chamber via an array of ports 35 formed in the tubular piston rod 26 adjacent the piston head 25. Moreover, the piston rod 26 is of lesser diameter than the axial opening 24 in the intermediate cylinder head 21 so that there is defined between the outer circumference of the tubular piston rod 26 and the inner circumference of axial opening 24, an annular passage 36 which provides communication between the low pressure chamber 14 and the flexible boot reservoir 15. Thus hydraulic fluid communication between the high pressure chamber 13 and the flexible boot reservoir 15 is established via the piston head orifice 34, the piston rod bore 30, the array of ports 35, the low pressure chamber 14, and the annular passage 36.

The flexible boot reservoir 15 may be formed from a suitable flexible and resilient material which is fluid impervious as for example rubber. The boot reservoir 15 is connected as by means of a hose clamp at one end to a boss 37 formed on the intermediate cylinder head 21. At the other end, the boot reservoir 15 is reversely turned and the turned end may be similarly clamped to the outer circumference of the tubular piston rod 26.

As shown, the boot reservoir 15 is constructed such that it is deflated and substantially devoid of hydraulic fluid in the neutral position of the cushion device. In the contracted position the displaced hydraulic fluid received within the boot reservoir 15 is operative to expand and inflate the latter such that it occupies the annular boot chamber 22 volume adjacent the open end of the cylinder 11.

The meeting pin 16 which serves to control the hydraulic fluid flow through the piston orifice 34 includes a metering body 38 slidable within the piston head orifice 34 and is of substantially constant diameter along the length thereof. The metering pin 16 may be made from a forging having an annular attachment flange 39 integrally formed on one end thereof. The metering pin 16 is inserted through an opening 40 in the base plate 19 and the annular flange 39 is received within a recess. Fastening means 41 extending through the annular flange 39 and threadably fastened to the base plate 19 fix the metering pin 16 thereto. To preclude the leakage there is disposed between the underside of the flange and the bottom wall of the recess a sealing gasket (not shown).

To achieve the substantially constant-force travel characteristic for each increment of travel of the cushion device to the contracted position, flutes 42 are formed along the length of the metering body 38. The flutes 42 are formed to coact with the piston head orifice 34 by varying the effective cross sectional area of the latter in a manner such that the hydraulic fluid pressure forces within the high pressure chamber remain substantially constant during the contraction of the cushion device 10. In this connection it is to be noted that the flutes 42 are formed such that the hydraulic fluid flow through the piston head orifice 34 is gradually diminished and finally cut-off as the cushion device travels to the contracted position shown in FIG. 2.

The return spring means 17 for returning the cushion device 10 to the neutral position may be a plurality of springs 17a, 17b and 17c arranged in tandem and which are disposed between the base plates 19 and 31. During the return travel, the direction of flow of the hydraulic fluid is reversed from that occurring during contraction of the device. It is to be noted, however, that the reverse hydraulic fluid flow from the flexible boot reservoir 15 and the low pressure chamber 14 through the piston head orifice 34 is initially restricted by the minimum cross sectional area available through the latter.

This initially restricted flow area causes a slow evacuation of the hydraulic fluid from the boot reservoir 14 and a slow refilling of the high pressure chamber 13. Hence, should impacts be applied to the cushion unit in rapid sequence before the high pressure chamber 13 is filled and the flexible boot reservoir 15 is evacuated, it is readily apparent that the partial volume of hydraulic fluid within the high pressure chamber 13 will result in a decreased resisting or cushioning force. Moreover, the hydraulic fluid displaced upon the rapidly applied sequential impacts will enter the still partially filled boot reservoir 15 so that the latter is expanded beyond its intended design volume. When thus over-expanded the yieldable boot reservoir 15 may extend longitudinally and radially beyond the confines of the boot chamber 22 and become entangled with the return springs 17a, 17b and 17c.

In accordance with the present invention the above difficulties are overcome by the provision of a plurality of reverse flow passages 43 extending through the piston head 25 and providing direct communication between the low pressure chamber 14 and high pressure chamber 13 during the return travel of the cushion device 10. The reverse flow passages 43 are angularly spaced about the piston head 25 and are diagonally disposed so that one end of each emerges at the bottom wall 44 of a peripheral groove 45. The other end of each of the reverse flow passages 43 opens into the conical feed face 33 formed on the high pressure face 32.

To provide fluid communication with the end of the passage opening in the bottom wall 44, the piston head 25 is formed of lesser diameter than the cylinder bore 20 so as to provide an annular space 46. Longitudinally slidable within the groove 45 is a sealing and guiding ring 47 which is of a thickness spanning or bridging the annular space 46. In the preferred form shown the ring 47, which may be of split ring construction, is formed from a laminated phenolic resin.

During the contraction of the hydraulic cushion unit 10 the pressure forces of the hydraulic fluid within the high pressure chamber 13 are exerted on the high pressure side 48 of the ring 47 such that the latter is moved to the left as viewed in FIG. 5 with the low pressure side 49 in abutting engagement with the groove side 50. In this position the ring 47 overlies the reverse flow passages 43 and thereby closes off hydraulic fluid flow therethrough during contraction of the cushion device 10. In this manner the full cushion force of the hydraulic cushion force is retained.

Upon return travel the pressure forces of the hydraulic fluid within the low pressure chamber 14 are greater than those in the high pressure chamber 13 such that the pressure forces acting on the low pressure side 49 of the ring 47 via the annular space 46 are operative to slide the ring to right as viewed in FIG. 6 and against the groove side 51. In this position the hydraulic fluid is free to flow through the reverse flow passages 43 from the low pressure chamber 14 into the high pressure chamber 13 as indicated in FIG. 6. Such hydraulic flow through the reverse flow passages 43 is in addition to that occurring through the effective cross sectional area of the piston head orifice 34.

Assuming now that the cushion device 10 of the present invention is employed in a cushion underframe railway and interposed between the sliding sill (not shown) and the stationary sill (not shown). In the absence of an impact on the sliding sill the cushion device 10 assumes the neutral position shown in FIG. 1. At the same time the sealing ring 47 may be in the position shown in FIG. 6 with the high pressure side 48 abutting against the groove wall 51.

Upon impact to the sliding sill at either end thereof the cushion unit 10, the fluid displacement means 12 and the cylinder 11 telescope relatively to each other toward the contracted position shown in FIG. 2. As the unit 10 contracts, the piston head 25 and the base plate 19 move toward each other whereupon the metering pin 16 fixed to the base plate displaces hydraulic fluid within the piston rod bore 30 outwardly through the array of ports 35 into the low pressure chamber 14 as indicated in FIG. 5 and into the flexible boot 15 reservoir via the annular opening 36.

The relative contraction of the piston head 25 and the base plate causes the hydraulic fluid pressure within the high pressure chamber 13 to increase to a substantially constant value such that the pressure forces acting on side 48 of the sealing ring 47 are operative to slide the latter in overlying relation with the reverse flow passages 43.

At the same time, hydraulic fluid displaced from the high pressure chamber 13 flows through piston head orifice of gradually diminishing cross sectional area into the piston rod bore 30. From the piston rod bore 30 the hydraulic fluid flows into the low pressure chamber 14 via the array of ports 35.

The hydraulic fluid is discharged into the low pressure chamber 14 at a relatively high velocity which creates considerable turbulence. The turbulance is caused at least in part, by the radially directed flow of the hydraulic fluid impinging directly against the bore wall so as to dissipate much of the kinetic energy of the impact in the form of heat.

When the cushion device 10 has completed its travel to the fully contracted or compressed position, the piston head 25 lies beyond the end of the flute 42 of the metering pin 16 such that substantially all hydraulic fluid flow therethrough is cut off.

Usually the return springs 17a, 17b and 17c acting in tandem between the base plates 31 and 19 are operative to extend the cushion device to the neutral position thereof. The force of the return spring is also operative to return the sliding sill (not shown) to the neutral position. During this period hydraulic fluid flow is reversed, flowing from the flexible boot reservoir 15, the low pressure chamber 14, and the array of ports 35 into the high pressure chamber 13 via the piston head orifice 34 which is gradually increasing in effective cross sectional area to provide greater flow area.

As heretofore mentioned, the hydraulic fluid flow through the piston head orifice 34 is substantially cut-off in the contracted position of the cushion unit. Thus, during the initial increments of return travel of the unit 10 under the influence of the return springs 17a, 17b and 17c, the pressure forces within the low pressure chamber 14 are greater than those present in the high pressure chamber 13. These high pressure forces of the hydraulic fluid acting on the low pressure face 49 of the sealing ring 47 via the annular space 46 are operative to slide the ring 47 to the right as viewed in FIG. 6. In this position of the ring 47, the reverse flow passages 34 are open so that hydraulic fluid flow occurs therethrough as shown by the direction of the flow arrows. At the same time flow occurs through the piston head orifice 34. In this manner, the flexible boot reservoir 15 and the low pressure chamber 14 are rapidly evacuated and the high pressure chamber 13 is completely filled with hydraulic fluid.

From the foregoing it should be readily apparent that the hydraulic fluid return flow to the high pressure chamber 13 will always be such as to maintain the latter filled even under a condition wherein the return travel of the cushion unit 10 may be accelerated. Such conditions creating rapid acceleration of the cushion device may occur when the sliding sill is impacted in the same direction as the return travel of the cushion device. The impact causes the sliding sill to disengage from the cushion device such that the return spring means 17 no longer moves the mass of the sill. Thus, the return travel of the cushion unit 10 may be more rapid.

The rapid return of the cushion unit components in the absence of the reverse flow passages 34 would result in only a partial filling of the high pressure chamber 13 and partial deflation of the flexible boot reservoir 15. If another impact is applied prior to the hydraulic fluid returning to the volumes occupied in the neutral position, an inadequate volume is present in the high pressure chamber 13 to achieve the required resisting force and the flexible boot reservoir may become over inflated.

However, with the structure of the present invention providing the reverse flow through the reverse flow passages 43 in addition to that occurring through the piston head orifice 34, a completely filled volume of hydraulic fluid within the high pressure chamber 13 is assured. Thus, the cushion device is substantially always in condition to achieve the requisite cushioning force.

What is claimed is:

1. In a hydraulic cushion device comprising a cylinder having a bore, a first base plate fixed to one end of said cylinder, an intermediate cylinder head fixed within said cylinder bore inwardly of the open end of said cylinder, said intermediate cylinder head defining on one side thereof with said first base plate a hydraulic fluid-filled bore and on the opposite side thereof adjacent said open end a flexible boot reservoir chamber, an axial opening in said intermediate cylinder head, a piston head means reciprocable within said bore and having a hydraulic fluid orifice means formed therein, said piston head means defining within said bore a high pressure chamber with said first base plate means and a low pressure chamber with said intermediate cylinder head and being movable from a neutral position and a contracted position, a tubular piston rod extending outwardly through said intermediate cylinder head axial orifice, a flexible boot reservoir connected between said intermediate cylinder head and said outwardly extending end of said tubular piston rod, said flexible boot reservoir having fluid communication with said cylinder bore, a second base plate fixed to the other end of said tubular piston head and return spring means disposed between said first and second base plates for returning said piston head from said contracted position to said neutral position; the improvement wherein said piston head means comprises a piston head having an outer diameter less than the diameter of said cylinder bore so as to define an annular space, reverse fluid flow passage means extending through said piston head from said outer circumference to the high pressure face thereof, and ring means mounted on said outer circumference spanning said annular space, said ring means being lengthwise slidable on said piston between a position cutting off hydraulic fluid flow through said reverse flow passages during the travel to said contracted position and a position permitting hydraulic fluid flow through said reverse flow passages during the return to said neutral position.

2. The invention as defined in claim 1 wherein said piston head is formed with a peripheral groove and said ring is slidably seated for lengthwise movement in said peripheral groove.

3. The invention as defined in claim 2 wherein said reverse flow passages are each inclined so that one end opens into said peripheral groove and said other end into said high pressure face, said end opening into said peripheral groove being located adjacent to said high pressure face.

4. The invention as defined in claim 3 wherein said end opening on said high pressure face is located on a concave feed surface formed thereon.

5. A hydraulic cushion device comprising a cylinder having a hydraulic fluid filled bore, a fluid displacement means reciprocable within said cylinder bore between a neutral extended position and a contracted position and being operative during said reciprocation to displace fluid, said fluid displacement means including a piston head defining within said cylinder bore a high pressure chamber and a low pressure chamber between which said hydraulic fluid is displaced, said piston head having a lesser diameter than said bore so as to provide an annular space, ring means mounted for lengthwise movement on the periphery of said piston head and spanning said annular space, and reverse flow passage means extending from the periphery of said piston head and the high pressure face of said piston head to provide fluid communication between said low pressure chamber and said high pressure chamber, said ring means being movable by the hydraulic fluid pressure forces in said high pressure chamber into overlying relationship with said reverse flow passages to cut-off fluid flow therethrough during travel of said device from the neutral to contracted position thereof and movable clear of said reverse flow passages permitting hydraulic fluid therethrough during return travel of said device from said contracted to said neutral position.

6. The invention as defined in claim 5 wherein lengthwise spaced stop means are provided on said piston head periphery to limit lengthwise movement of said ring.

7. The invention as defined in claim 6 wherein said stop means is formed by the side walls of a peripheral groove in which said ring is disposed.

References Cited by the Examiner
UNITED STATES PATENTS

| | | | |
|---|---|---|---|
| 2,914,195 | 11/59 | Pawling | 213—43 |
| 3,033,384 | 5/62 | Zanow et al. | 213—43 |

FOREIGN PATENTS

| | | |
|---|---|---|
| 1,067,051 | 1/56 | Germany. |

MILTON BUCHLER, *Primary Examiner.*